United States Patent [19]
Matsui

[11] 4,338,001
[45] Jul. 6, 1982

[54] TELEPHOTO LENS SYSTEM

[75] Inventor: Sei Matsui, Chiba, Japan

[73] Assignee: Nippon Kogaku K.K., Tokyo, Japan

[21] Appl. No.: 153,787

[22] Filed: May 27, 1980

[30] Foreign Application Priority Data

Jun. 6, 1979 [JP] Japan ................... 54/69871

[51] Int. Cl.³ .................. G02B 9/60; G02B 13/02
[52] U.S. Cl. .................................. 350/455
[58] Field of Search ................. 350/454, 455

[56] References Cited
U.S. PATENT DOCUMENTS

| | | | |
|---|---|---|---|
| 3,502,394 | 3/1970 | Kobayashi | 350/455 |
| 3,868,174 | 2/1975 | Yakota | 350/455 |
| 3,966,307 | 6/1976 | Tojyo | 350/455 |

FOREIGN PATENT DOCUMENTS 47-8109  3/1972  Japan ................... 350/455

*Primary Examiner*—John K. Corbin
*Assistant Examiner*—Rebecca D. Gass
*Attorney, Agent, or Firm*—Shapiro and Shapiro

[57] ABSTRACT

A telephoto lens system has a convergent forward group and a divergent rearward group. The forward group includes a first lens which is a biconvex lens having its surface of greater curvature facing the object side, a second lens which is a biconcave lens having its surface of greater curvature facing the object side, and a third lens which is a positive meniscus lens having its convex surface facing the object side. The rearward group includes a fourth lens which is a concave lens having its surface of greater curvature facing the object side, and a fifth lens which is a biconvex lens. The lens system satisfies predetermined conditions.

5 Claims, 10 Drawing Figures

SPHERICAL ABERRATION

ASTIGMATISM

DISTORTION

SPHERICAL ABERRATION

F2.8 d-LINE  g-LINE

-0.2  0  0.2

ASTIGMATISM 6.8°

SAGITTAL RAYS  MERIDIONAL RAYS

-0.2  0  0.2

DISTORTION 6.8°

-1  0  1%

SPHERICAL ABERRATION

F2.8 g-LINE  d-LINE

-0.2  0  0.2

ASTIGMATISM 6.8°

MERIDIONAL RAYS  SAGITTAL RAYS

-0.2  0  0.2

DISTORTION 6.8

-1  0  1%

TELEPHOTO LENS SYSTEM

BACKGROUND OF THE INVENTION

1. Field of the Invention

This invention relates to a telephoto lens.

2. Description of the Prior Art

In telephoto lenses, it is generally desirable that the distance from the foremost surface of the lens to the focal plane thereof (namely, the total length of the lens) be small, but there is a limit to the reduction in such distance in order to well balance various aberrations in a practicable range. Further, it has been unavoidable that as the brightness of the lens is higher, the ratio of the total length to the focal length, the so-called telephoto ratio, becomes greater.

Accordingly, in the known typical telephoto lenses of five-group construction like the lens of the present invention, the F-numbers thereof has been F4 or F5.6 at best.

SUMMARY OF THE INVENTION

It is an object of the present invention to provide a great aperture ratio telephoto lens of short full length having a brightness of F2.8 and yet having a telephoto ratio (the ratio of the total length of the lens to the focal length) of the order of 0.9–0.96 and in which various aberrations including chromatic aberration have been well corrected.

The invention will become fully apparent from the following detailed description thereof taken in conjunction with the accompanying drawings.

DESCRIPTION OF THE PREFERRED EMBODIMENTS

Figure 1:
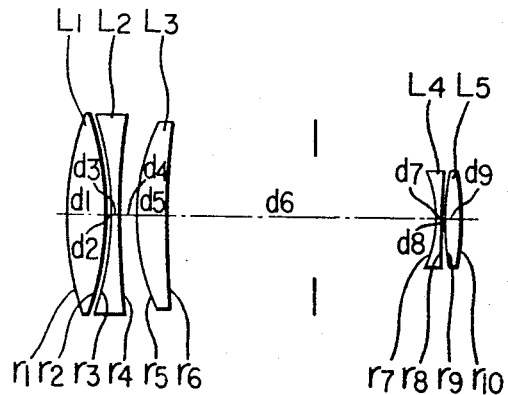
FIG. 1 is a cross-sectional view showing the construction of the lens according to the present invention.

A structural feature of the present invention lies in a lens system comprising five groups of lenses forming a convergent forward group and a divergent rearward group with a stop S interposed therebetween, the convergent forward group comprising three groups of lenses, namely, a first lens $L_1$ which is a biconvex lens having its surface of greater curvature facing the object side, a second lens $L_2$ which is a biconcave lens having its surface of greater curvature facing the object side, and a third lens $L_3$ which is a positive meniscus lens having its convex surface facing the object side, the divergent rearward group comprising two groups of lenses, namely, a fourth lens $L_4$ which is a convex lens having its surface of greater curvature facing the object side, and a fifth lens $L_5$ which is a biconvex lens having its surface of greater curvature facing the image side, said lens system satisfying the following conditions:

$$0.75f < f_1 < 0.85f \quad \text{(I)}$$

$$0.8f < |f_2| < 1.2f$$

$$0.55f < l < 0.6f$$

$$1 < |r_2/r_3| < 1.1 \quad \text{(II)}$$

$$d_2 < 0.015f$$

$$n_1 < 1.54, \nu_1 > 65 \quad \text{(III)}$$

$$n_2 > 1.7, \nu_2 < 40$$

$$1.6 < n_3 < 1.7, 50 < \nu_3 < 60$$

where $f_1$ represents the focal length of the forward group, $f_2$ represents the focal length of the rearward group, $f$ represents the focal length of the entire system, $l$ represents the spacing between the principal points of the two groups $r_1$–$r_{10}$ represent the curvature radii of the successive lenses, $d_1$–$d_9$ represent the center thicknesses and air spaces of the successive lenses, and $n_1$–$n_5$ and $\nu_1$–$\nu_5$ represent the refractive indices and Abbe numbers, respectively, of the successive lenses.

Condition (I) is a basically necessary condition for well balancing the spherical aberration, astigmatism, curvature of image field, distortion, etc. in a practicable range in a telephoto lens having a telephoto ratio of 0.9–0.96 and F-number of the order of F2.8. If the focal length $f_1$ of the forward group becomes greater beyond the upper limit of this condition, it will be disadvantageous in shortening the length of the entire system and if the focal length $f_1$ becomes smaller beyond the lower limit of this condition, it will be advantageous in shortening the length of the entire system but the refractive power of the rearward group will have to be intensified and this will be disadvantageous to well maintain the balance of curvature of image field and distortion. It will also be disadvantageous in respect of chromatic aberration when it is taken into account that the intense refractive power of the rearward group enlarges the secondary spectrum generated in the forward group. The next two conditions are the conditions for the desirable focal length $f_2$ of the rearward group when the focal length $f_1$ of the forward group is determined within said conditional range, and for the spacing $l$ between the principal points of the two groups. If $|f_2|$ becomes greater beyond the upper limit, it will be advantageous in correcting the curvature of image field and distortion, but it will be difficult to correct the spherical aberration and coma generated in the forward group and conversely, if $|f_2|$ becomes smaller beyond the lower limit, it will be disadvantageous in maintaining the balance of curvature of image field and distortion. The spacing $l$ between the principal points of the two groups is a preferable condition for the balance of various aberrations when the focal length $f_1$ of the forward group and the focal length $f_2$ of the rearward group have been selected within said ranges. Such three conditions (I) are the basic conditions for realizing the lens aimed at by the present invention.

Condition (II) is the condition for well balancing the spherical aberration, chromatic spherical aberration, coma, etc. which, if generated in the forward group, could not be corrected by the rearward group even when the basic conditions (I) are satisfied. The rear surface $r_2$ of the first lens $L_1$ and the front surface $r_3$ of of the second lens $L_2$ are originally achromatizing surfaces and the chromatic aberration generated in the rear surface $r_2$ of the first lens $L_1$ must be negated by the front surface $r_3$ of the second lens $L_2$. Accordingly, the curvature of the rear surface $r_2$ of the first lens and the curvature of the front surface $r_3$ of the second lens should preferably be approximate in value to each other, and the distance $d_2$ between these two surfaces should preferably be as small as possible. However, if the value of $|r_2/r_3|$ exceeds its lower limit (that is, if $|r_2| < |r_3|$), the negative spherical aberration generated in the rear surface $r_2$ of the first lens could not be corrected and as a whole, under-correction would be provided while, at the same time, chromatic spherical aberration (short wavelength side) would further be undercorrected and this is not preferable. If the upper limit is exceeded, it will not be preferable for the purpose of achromatism.

Condition (III) is necessary for balancing particularly the axial chromatic aberration and lateral chromatic aberration after said conditions (I) and (II) have been satisfied, and the selection of glass in this range is preferable.

By satisfying the foregoing conditions (I), (II) and (III) at a time, there can be provided a compact lens system in which the various aberrations have been well corrected as shown in the following embodiments.

Numerical data in the embodiments of the present invention will be shown below. In the lists below, $r_1$, $r_2$, $r_3$ ... represent the curvature radii of the successive lens surfaces in the order from the object side, $d_1$, $d_2$, $d_3$ ... represent the distances between the successive lens surfaces, and $n_1$, $n_2$ ... and $\nu_1$, $\nu_2$ ... represent the refractive indices and Abbe numbers, respectively, of the successive lenses.

Embodiment 1:

| Focal length | $f = 100$ | Aperture ratio 1:2.8 | |
|---|---|---|---|
| Angle of view | $2\omega = 13.6°$ | | |
| $r_1 = 54.95$ | $d_1 = 6.667$ | $n_1 = 1.50032$ | $\nu_1 = 81.9$ |
| $r_2 = -78.333$ | $d_2 = 1.111$ | | |
| $r_3 = -76.698$ | $d_3 = 2.056$ | $n_2 = 1.7495$ | $\nu_2 = 35$ |
| $r_4 = 207.222$ | $d_4 = 3.056$ | | |
| $r_5 = 43.208$ | $d_5 = 5.111$ | $n_3 = 1.65844$ | $\nu_3 = 50.8$ |
| $r_6 = 134.444$ | $d_6 = 50.667$ | | |
| $r_7 = -19.462$ | $d_7 = 1.111$ | $n_4 = 1.51823$ | $\nu_4 = 59$ |
| $r_8 = -305.556$ | $d_8 = 0.056$ | | |
| $r_9 = 122.222$ | $d_9 = 2.222$ | $n_5 = 1.79668$ | $\nu_5 = 45.4$ |
| $r_{10} = -89.522$ | | | |

Telephoto ratio: 0.949
$f_1 = 80.108$
$f_2 = -111.627$
$l = 57.902$

Embodiment 2:

| Focal length | $f = 100$ | Aperture ratio 1:2.8 | |
|---|---|---|---|
| Angle of view | $2\omega = 13.6°$ | | |
| $r_1 = 55.012$ | $d_1 = 6.389$ | $n_1 = 1.50032$ | $\nu_1 = 81.9$ |
| $r_2 = -78.244$ | $d_2 = 1.167$ | | |
| $r_3 = -76.698$ | $d_3 = 2.056$ | $n_2 = 1.7495$ | $\nu_2 = 35$ |
| $r_4 = 207.222$ | $d_4 = 3.500$ | | |
| $r_5 = 43.208$ | $d_5 = 5.111$ | $n_3 = 1.65844$ | $\nu_3 = 50.8$ |
| $r_6 = 133.333$ | $d_6 = 50.500$ | | |
| $r_7 = -19.722$ | $d_7 = 1.000$ | $n_4 = 1.51454$ | $\nu_4 = 54.6$ |
| $r_8 = -305.556$ | $d_8 = 0.278$ | | |
| $r_9 = 122.222$ | $d_9 = 2.778$ | $n_5 = 1.79668$ | $\nu_5 = 45.4$ |
| $r_{10} = -90.107$ | | | |

Telephoto ratio: 0.957
$f_1 = 80.383$
$f_2 = -118.959$
$l = 57.046$

Embodiment 3:

| Focal length | $f = 100$ | Aperture ratio 1:2.8 | |
|---|---|---|---|
| Angle of view | $2\omega = 13.6°$ | | |
| $r_1 = 52.332$ | $d_1 = 6.667$ | $n_1 = 1.50032$ | $\nu_1 = 81.9$ |
| $r_2 = -75.000$ | $d_2 = 1.056$ | | |
| $r_3 = -72.222$ | $d_3 = 1.944$ | $n_2 = 1.7495$ | $\nu_2 = 35$ |
| $r_4 = 194.444$ | $d_4 = 0.333$ | | |
| $r_5 = 41.056$ | $d_5 = 5.167$ | $n_3 = 1.61484$ | $\nu_3 = 51.1$ |
| $r_6 = 151.922$ | $d_6 = 49.389$ | | |
| $r_7 = -18.333$ | $d_7 = 1.667$ | $n_4 = 1.5168$ | $\nu_4 = 64.2$ |
| $r_8 = -333.611$ | $d_8 = 0.056$ | | |
| $r_9 = 91.672$ | $d_9 = 1.667$ | $n_5 = 1.79631$ | $\nu_5 = 40.8$ |
| $r_{10} = -131.287$ | | | |

Telephoto ratio: 0.902

-continued $f_1 = 76.943$
$f_2 = -88.791$
$l = 56.467$

Figure 2A:
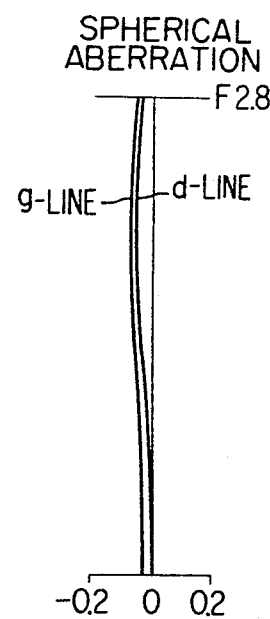
FIGS. 2A–2C, 3A–3C and 4A–4C illustrate the aberrations in a first, a second and a third embodiment of the present invention.
Figure 2B:
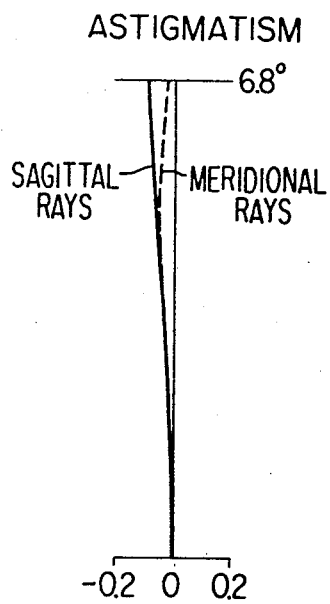
Figure 2C:
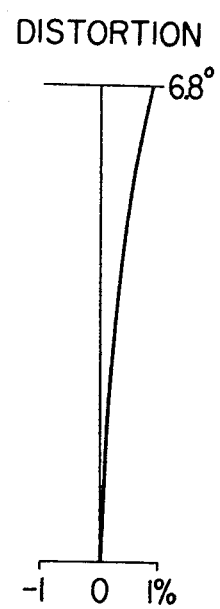
Figure 3A:
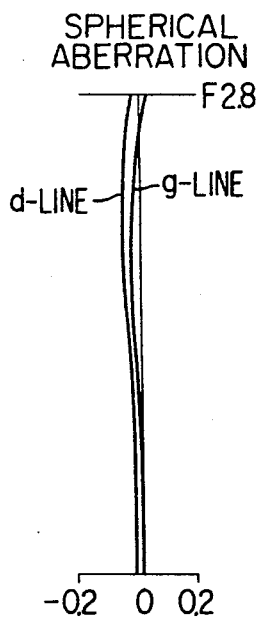
Figure 3B:
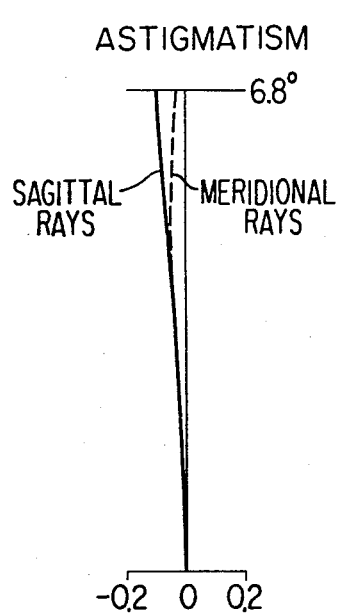
Figure 3C:
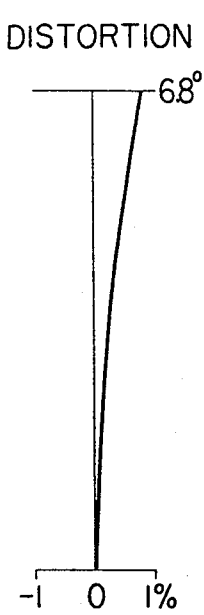
Figure 4A:
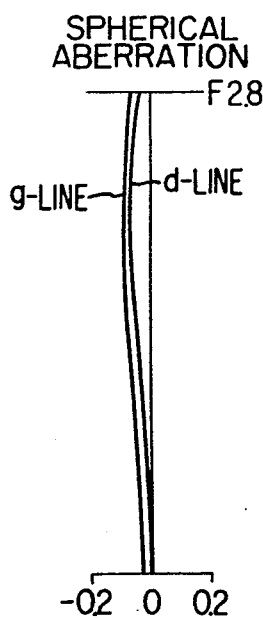
Figure 4B:
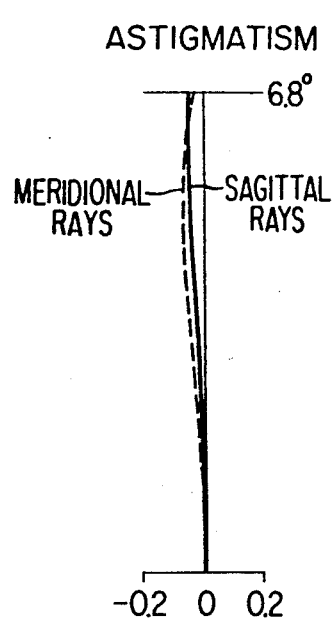
Figure 4C:
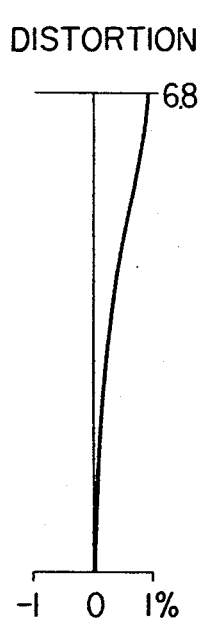

The various aberrations in the foregoing embodiments are successively shown in FIGS. 2, 3 and 4. As shown, in any of the embodiments, the full length of the entire system is short, and yet all the aberrations including chromatic aberration are well corrected.

I claim:

1. A telephoto lens system having a convergent forward group including a first lens which is a biconvex lens having its surface of greater curvature facing the object side, a second lens which is a biconcave lens having its surface of greater curvature facing the object side, and a third lens which is a positive meniscus lens having its convex surface facing the object side, and a divergent rearward group including a fourth lens which is a concave lens having its surface of greater curvature facing the object side, and a fifth lens which is a biconvex lens, said lens system satisfying the following conditions:

$$0.75f < f_1 < 0.85f \quad \text{(I)}$$

$$0.8f < |f_2| < 1.2f$$

$$0.55f < l < 0.6f$$

$$1 < |r_2/r_3| < 1.1 \quad \text{(II)}$$

$$d_2 < 0.015f$$

$$n_1 < 1.54, \nu_1 > 65 \quad \text{(III)}$$

$$n_2 > 1.7, \nu_2 < 40$$

$$1.6 < n_3 < 1.7, 50 < \nu_3 < 60$$

where $f_1$ represents the focal length of said forward group, $f_2$ represents the focal length of said rearward group, $f$ represents the focal length of the entire system, $l$ represents the spacing between the principal points of the two groups, $r_1$-$r_{10}$ represent the curvature radii of the successive lenses, $d_1$-$d_9$ represent the center thicknesses and air spaces of the successive lenses, and $n_1$-$n_5$ and $\nu_1$-$\nu_5$ represent the refractive indices and Abbe numbers, respectively, of the successive lenses.

2. A telephoto lens system according to claim 1, wherein the F-number of said lens system is 2.8 and the telephoto ratio (the full length of the entire lens system to the focal length) of said lens system is 0.9-0.96.

3. A telephoto lens system according to claim 2, wherein numerical data are as follows:

| Focal length | $f = 100$ | Aperture ratio 1:2.8 | |
|---|---|---|---|
| Angle of view | $2\omega = 13.6°$ | | |
| $r_1 = 54.95$ | $d_1 = 6.667$ | $n_1 = 1.50032$ | $\nu_1 = 81.9$ |
| $r_2 = -78.333$ | $d_2 = 1.111$ | | |
| $r_3 = -76.698$ | $d_3 = 2.056$ | $n_2 = 1.7495$ | $\nu_2 = 35$ |
| $r_4 = 207.222$ | $d_4 = 3.056$ | | |
| $r_5 = 43.208$ | $d_5 = 5.111$ | $n_3 = 1.65844$ | $\nu_3 = 50.8$ |
| $r_6 = 134.444$ | $d_6 = 50.667$ | | |
| $r_7 = -19.462$ | $d_7 = 1.111$ | $n_4 = 1.51823$ | $\nu_4 = 59$ |
| $r_8 = -305.556$ | $d_8 = 0.056$ | | |
| $r_9 = 122.222$ | $d_9 = 2.222$ | $n_5 = 1.79668$ | $\nu_5 = 45.4$ |
| $r_{10} = -89.522$ | | | |

Telephoto ratio: 0.949
$f_1 = 80.108$
$f_2 = -111.627$

-continued $l = 57.902$ where $r_1, r_2, r_3 \ldots$ represent the curvature radii of the successive lens surfaces in the order from the object side, $d_1, d_2, d_3 \ldots$ represent the distances between the successive lens surfaces, and $n_1, n_2 \ldots$ and $\nu_1, \nu_2, \ldots$ represent the refractive indices and Abbe numbers, respectively, of the successive lenses.

4. A telephoto lens system according to claim 2, wherein numerical data are as follows:

| Focal length | $f = 100$ | Aperture ratio 1:2.8 | |
|---|---|---|---|
| Angle of view | $2\omega = 13.6°$ | | |
| $r_1 = 55.012$ | $d_1 = 6.389$ | $n_1 = 1.50032$ | $\nu_1 = 81.9$ |
| $r_2 = -78.244$ | $d_2 = 1.167$ | | |
| $r_3 = -76.698$ | $d_3 = 2.056$ | $n_2 = 1.7495$ | $\nu_2 = 35$ |
| $r_4 = 207.222$ | $d_4 = 3.500$ | | |
| $r_5 = 43.208$ | $d_5 = 5.111$ | $n_3 = 1.65844$ | $\nu_3 = 50.8$ |
| $r_6 = 133.333$ | $d_6 = 50.500$ | | |
| $r_7 = -19.722$ | $d_7 = 1.000$ | $n_4 = 1.51454$ | $\nu_4 = 54.6$ |
| $r_8 = -305.556$ | $d_8 = 0.278$ | | |
| $r_9 = 122.222$ | $d_9 = 2.778$ | $n_5 = 1.79668$ | $\nu_5 = 45.4$ |
| $r_{10} = 90.107$ | | | |
| Telephoto ratio: 0.957 | | | |
| $f_1 = 80.383$ | | | |
| $f_2 = -118.959$ | | | |
| $l = 57.046$ | | | | where $r_1, r_2, r_3 \ldots$ represent the curvature radii of the successive lens surfaces in the order from the object side, $d_1, d_2, d_3 \ldots$ represent the distances between the successive lens surfaces, and $n_1, n_2 \ldots$ and $\nu_1, \nu_2 \ldots$ represent the refractive indices and Abbe numbers, respectively, of the successive lenses.

5. A telephoto lens system according to claim 2, wherein numerical data are as follows:

| Focal length | $f = 100$ | Aperture ratio 1:2.8 | |
|---|---|---|---|
| Angle of view | $2\omega = 13.6°$ | | |
| $r_1 = 52.332$ | $d_1 = 6.667$ | $n_1 = 1.50032$ | $\nu_1 = 81.9$ |
| $r_2 = -75.000$ | $d_2 = 1.056$ | | |
| $r_3 = -72.222$ | $d_3 = 1.944$ | $n_2 = 1.7495$ | $\nu_2 = 35$ |
| $r_4 = 194.444$ | $d_4 = 0.333$ | | |
| $r_5 = 41.056$ | $d_5 = 5.167$ | $n_3 = 1.61484$ | $\nu_3 = 51.1$ |
| $r_6 = 151.922$ | $d_6 = 49.389$ | | |
| $r_7 = -18.333$ | $d_7 = 1.667$ | $n_4 = 1.5168$ | $\nu_4 = 64.2$ |
| $r_8 = -333.611$ | $d_8 = 0.056$ | | |
| $r_9 = 91.672$ | $d_9 = 1.667$ | $n_5 = 1.79631$ | $\nu_5 = 40.8$ |
| $r_{10} = -131.287$ | | | |
| Telephoto ratio: 0.902 | | | |
| $f_1 = 76.943$ | | | |
| $f_2 = -88.791$ | | | |
| $l = 56.467$ | | | | where $r_1, r_2, r_3 \ldots$ represent the curvature radii of the successive lens surfaces in the order from the object side, $d_1, d_2, d_3 \ldots$ represent the distances between the successive lens surfaces, and $n_1, n_2 \ldots$ and $\nu_1, \nu_2 \ldots$ represent the refractive indices and Abbe numbers, respectively, of the successive lenses.

* * * * *